United States Patent [19]

Finkel et al.

[11] 4,442,541

[45] Apr. 10, 1984

[54] METHODS OF AND APPARATUS FOR SENSING THE DENOMINATION OF PAPER CURRENCY

[75] Inventors: Joel R. Finkel, Wayland; William E. Freudenthal, Marlborough, both of Mass.; John G. Stoides, Culpeper, Va.

[73] Assignee: GTE Laboratories Incorporated, Waltham, Mass.

[21] Appl. No.: 67,064

[22] Filed: Aug. 15, 1979

[51] Int. Cl.³ .......... G06K 7/08; B07C 5/00

[52] U.S. Cl. .......... 382/7; 209/534; 235/449; 382/64

[58] Field of Search .......... 194/4 E, 4 R; 209/534, 209/567; 340/146.3 Q, 146.3 AQ, 146.3 R, 146.3 H; 360/67; 235/449, 454, 493; 382/7, 64

[56] References Cited

U.S. PATENT DOCUMENTS

| | | | |
|---|---|---|---|
| 3,180,491 | 4/1965 | Danko | 194/4 E |
| 3,223,988 | 12/1965 | Danko | 360/67 |
| 3,280,974 | 10/1966 | Riddle et al. | 209/567 |
| 3,509,535 | 4/1970 | Berube | 194/4 R |
| 3,612,835 | 10/1971 | Andrews et al. | 235/449 |
| 3,715,031 | 2/1973 | Okkonen | 209/534 |
| 3,870,629 | 3/1975 | Carter et al. | 209/534 |
| 3,966,047 | 6/1976 | Steiner | 209/534 |
| 4,041,456 | 8/1977 | Ott et al. | 340/146.3 Q |
| 4,096,991 | 6/1978 | Iguchi | 235/449 |
| 4,114,804 | 8/1976 | Jones et al. | 194/4 R |
| 4,179,685 | 12/1979 | O'Maley | 340/146.3 AQ |

*Primary Examiner*—Leo H. Boudreau

*Attorney, Agent, or Firm*—Fred Fisher

[57] ABSTRACT

United States paper currency can be denomination sensed by a system for scanning a predetermined path along one surface and comparing the resultant scan against a standard for a particular denomination. Subsequently, it is determined whether the scanned currency is of a particular denomination or is questionable. The one surface can be an obverse surface of paper currency, the predetermined path of the obverse surface can be magnetically scanned; the scanning direction occurs along a major axis of the currency; and the scanned currency can be sorted in accordance with the determination. Various denominations can be determined at one time either in seriatim or in parallel. In a particular form, the denomination of United States Federal Reserve Notes are sensed by magnetically scanning at least three parallel predetermined paths of an obverse surface of a note to be denomination sensed, comparing the results of the scanning against a like plurality of standards for each of the various denominations of one, two, five, ten, twenty, fifty and one hundred dollars, and determining whether the scanned note is of such one, two, five, ten, twenty, fifty, one hundred dollar denominations or is questionable. The scanned Notes are sorted in accordance with the determination.

2 Claims, 16 Drawing Figures

$1 FRN $2 FRN $5 FRN $10 FRN $20 FRN $50 FRN $100 FRN

METHODS OF AND APPARATUS FOR SENSING THE DENOMINATION OF PAPER CURRENCY

BACKGROUND OF THE INVENTION

1. Field of the Invention

This invention relates to methods of and apparatus for magnetically sensing the denomination of paper currency, and, in particular, for sensing the denomination of U.S. Federal Reserve Notes. Accordingly, it is a general object of this invention to provide new and improved methods and apparatus of such character.

2. Description of the Prior Art

This invention deals with the determination or verification of the denomination of U.S. currency by way of magnetic pattern recognition while the currency is undergoing a high speed sorting and counting process.

It is desirable to automate cash handling procedures in spite of two prevalent problems:

1. An accounting problem that arises when tellers inadvertently place a Note of one denomination into a packet of Notes of some different denomination, for example, a five dollar Federal Reserve Note in with a packet of ten dollar Federal Reserve Notes.

2. A denominating problem that arises when unscrupulous individuals "raise" the value of a Note of one denomination by physical alteration of the numerals in the corners of the Note. One form of deception is to either carefully draw in "0's" after "1's" of a one dollar Federal Reserve Note, or to paste the corners torn from a legitimate ten dollar Federal Reserve Note over the "1's" of a one dollar Federal Reserve Note, thus converting a genuine one dollar Federal Reserve Note into an apparent or fraudulent ten dollar Federal Reserve Note.

In general, the prior art has been concerned with the authenticity of U.S. currency by detection or differentiation of patterns of magnetic ink on the obverse faces of the Notes. The prior art generally does not teach methods of denomination verification.

The instant invention overcomes the foregoing problems by determining the true denomination of each Note and comparing it against a desired denomination. Methods and apparatus in accordance with the invention permit the detection and consequent removal of incorrect denomination of currency for substantive corrective action by automated methods. In addition, authenticity can be determined to high accuracy.

SUMMARY OF THE INVENTION

In accordance with a preferred embodiment of the invention, a method of and apparatus for scanning the denomination of paper currency can include steps and means for magnetically scanning at least three parallel predetermined paths along an obverse surface of a paper currency to be denomination sensed. The results of the scanning are compared against a like plurality of standards for each of various denominations. A determination is to be made as to whether the scanned currency is one of the various scanned circuitry is sorted in accordance with such a determination.

In accordance with another embodiment of the invention, a method of and apparatus for sensing the denomination of U.S. Federal Reserve Notes includes steps and means for magnetically scanning at least three parallel predetermined paths along an obverse surface of a Note to be denomination sensed. The results of the scanning are compared against a like plurality of standards for each of the various denominations; one, two, five, ten, twenty, fifty, and one hundred dollars. A determination is performed as to whether the scanned note is a one dollar denomination, a two dollar denomination, a five dollar denomination, a ten dollar denomination, a twenty dollar denomination, a fifty dollar denomination, a one hundred dollar denomination, or is questionable. The scanned note is sorted in accordance with such a determination.

BRIEF DESCRIPTION OF THE DRAWINGS

Other objects, advantages and features of this invention, together with its construction and mode of operation, will become more apparent from the following description, when read in conjunction with the accompanying drawing, in which.

DESCRIPTION OF PREFERRED EMBODIMENTS

Various differences are present among the common denominations of U.S. currency in general circulation, that is, the one, two, five, ten, twenty, fifty and one hundred dollar Federal Reserve Notes. They include the denomination numeral; the portrait; the denomination name that appears under the Treasury seal at the right center of the Note; the length, height, position and shape of the "Federal Reserve Note" legend; the appearance of carets (heavy solid deposits of ink) at certain spots; the length, height, position and shape of the "The United States of America" legend; and the type of border about the portrait. All of these characteristics are printed with an iron oxide based ink and are, therefor, magnetically susceptible, except for certain portions which are printed with other ink which cannot be magnetically detected.

When the paper currency is moved through a magnetic field in a transport bed, the previously random orientation of magnetic moments of individual particles of iron oxide become ordered. There are certain areas on the obverse face of each denomination note where the ink print, and, hence, the magnetizable pattern, is unique for that specific denomination. Therefore, when the notes are run past a magnetic field and then past a read head, the read head can sense the magnetic pattern and convert it into an electronic pattern that corresponds to the physical presence or absence of the ink (and to the quantity present in any one area). The sensed signal can then be compared to the signal that should be received from a note of the specific denomination being sought. The comparator can then provide an output signal indicative of denomination verification.

Figure 1:
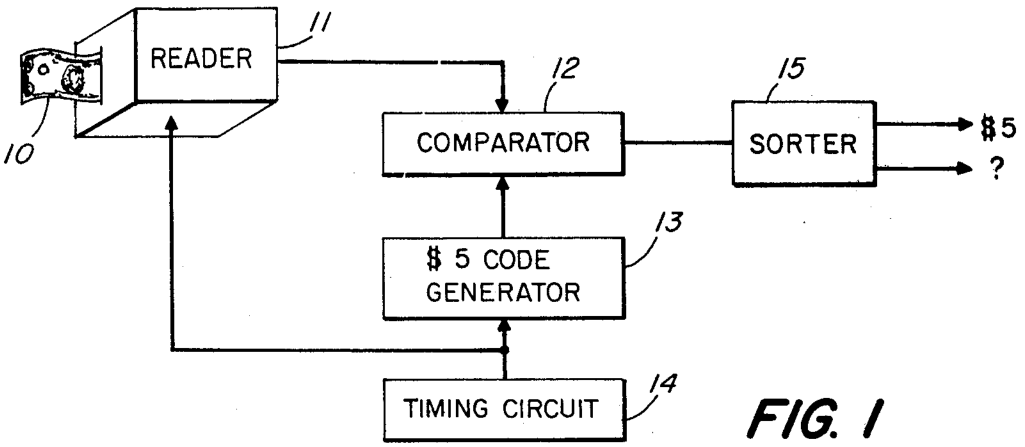
FIG. 1 is a block diagram of one embodiment of the invention illustrating a system for scanning paper currency for bills of a particular denomination.

Referring to FIG. 1, there is shown a simplified block diagram of an embodiment of the invention in which a bill 10 of a particular denomination, such as a five dollar bill, is inserted into a reader 11. The reader 11 scans a path in a direction along a major axis of the currency, the path being predetermined and constant for every bill 10 being read. The reader 11 generates a magnetic field onto the obverse surface of the currency and can be either DC or AC oriented. The reader 11 further reads a magnetic signal from the currency being sensed, and provides an electronic signal indicative of the path being read to a comparator 12. The comparator 12 receives a signal from a code generator 13 for that particular denomination. The code generator 13 and the reader 11 are excited and controlled by a timing circuit 14. The output of the comparator 12 is coupled to a sorter 15. The sorter 15 segregates sensed bills for that particular denomination from sensed bills which are questionable.

In operation, the bill 10 to be sensed (such as a five dollar bill) is applied to the reader 11. Upon engagement with the reader 11, the timing circuit 14 causes the bill 10 to be sensed in a predetermined direction along its major axis. The reader 11 provides an electronic output signal therefrom to the comparator 12, the timing circuit 14 causing the code generator 13 to provide an electronic output signal corresponding to such currency (i.e., a genuine five dollar bill) to the comparator 12. The output of the comparator 12 indicates to the sorter 15 either that the bill 10 being read is genuine(i.e., a genuine five dollar bill) or is questionable. The sorter 15 appropriately sorts the bill 10 into a bin (not shown) for a genuine five dollar bill or to a bin for a questionable bill.

A questionable bill may be counterfeit, exceedingly worn, inverted, reversed, or different denomination.

Figure 2:
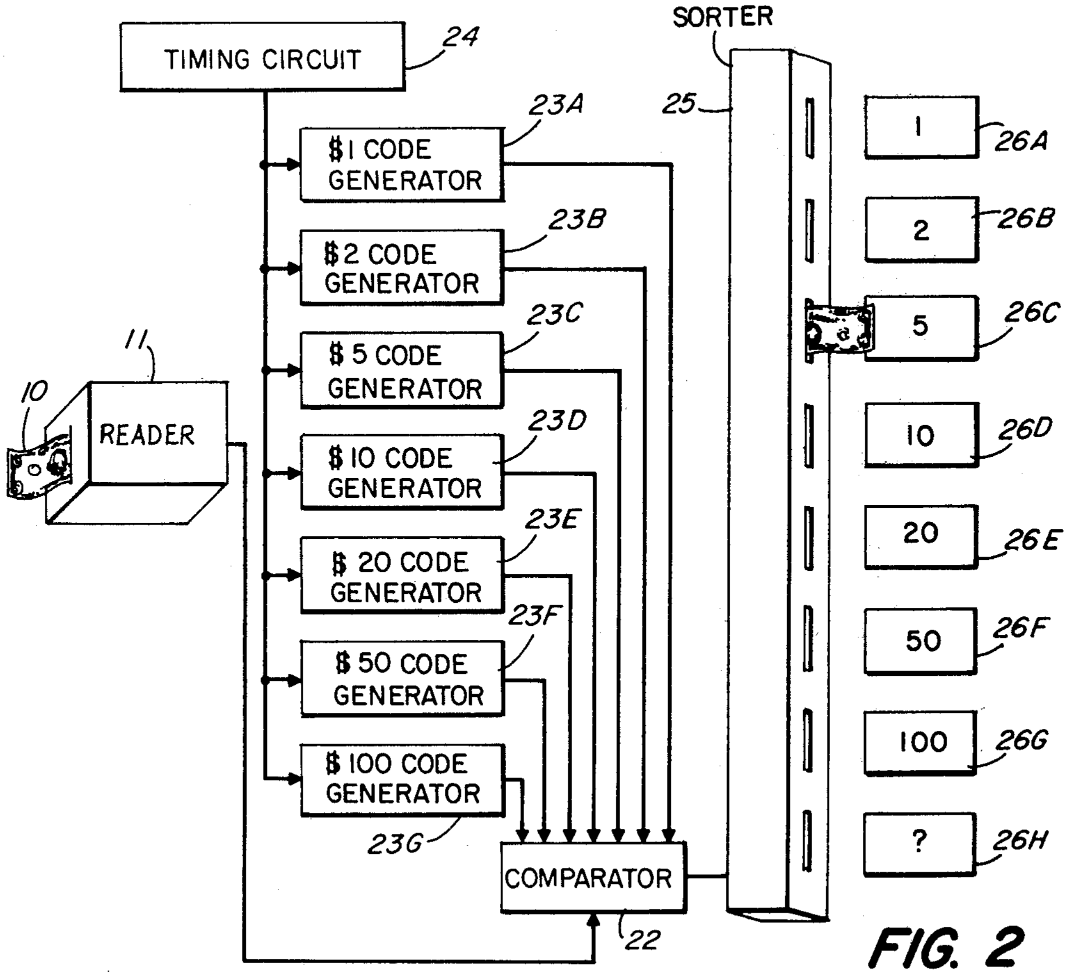
FIG. 2 is a block diagram of an embodiment of the invention illustrating a system for scanning paper currency for determining the denomination thereof.

Referring to FIG. 2, there is shown an illustrative diagram of an embodiment in which a bill 20, such as a five dollar bill, is inserted into a reader 21. The output of the reader 21 is coupled to a comparator 22. A one dollar code generator 23A is coupled to the comparator 22. Likewise, a two dollar code generator 23B; a five dollar code generator 23C; a ten dollar code generator 23D; a twenty dollar code generator 23E; a fifty dollar code generator 23F; and a one hundred dollar code generator 23G are each coupled to the comparator 22. A timing circuit 24 is coupled to each of the code generators 23A through 23G inclusive, and is also coupled to the reader 21. The output of the comparator 22 is coupled to a sorter 25. The bill 20 to be read is inserted into the reader 21 and, upon detection by the reader 21, the timing circuit 24 causes the reader 21 to read the bill 20. The reader 21, upon reading a predetermined path along the major axis of the bill 20, provides an electronic signal indicative of the magnetic pattern on the bill 20 to the comparator 22 which compares the signal that was read from the bill 20 against standard codes for like paths on one, two, five, ten, twenty, fifty, and one hundred dollar bills. The one, two, five, ten, twenty, fifty, and one hundred dollar code generators 23A–G are each coupled to the comparator 22. The output from the reader 21 can be compared either in seriatum or in parallel against the outputs of the code generators 23A–G depending upon the relationship with the timing circuit 24. In accordance with the output of the comparator 22 (which indicates that the scanned bill 20 is a one, two, five, ten, twenty, fifty, or one hundred dollar bill, or, in the alternative, is questionable), the sorter 25 sorts the bill 20 and applies it to one of various output bins 26A, 26B, 26C, 26D, 26E, 26F, 26G when the bill is a genuine one, two, five, ten, twenty, fifty, or one hundred dollar bill, or applies it to an output bin 26H when the bill 20 is questionable.

Figure 3:
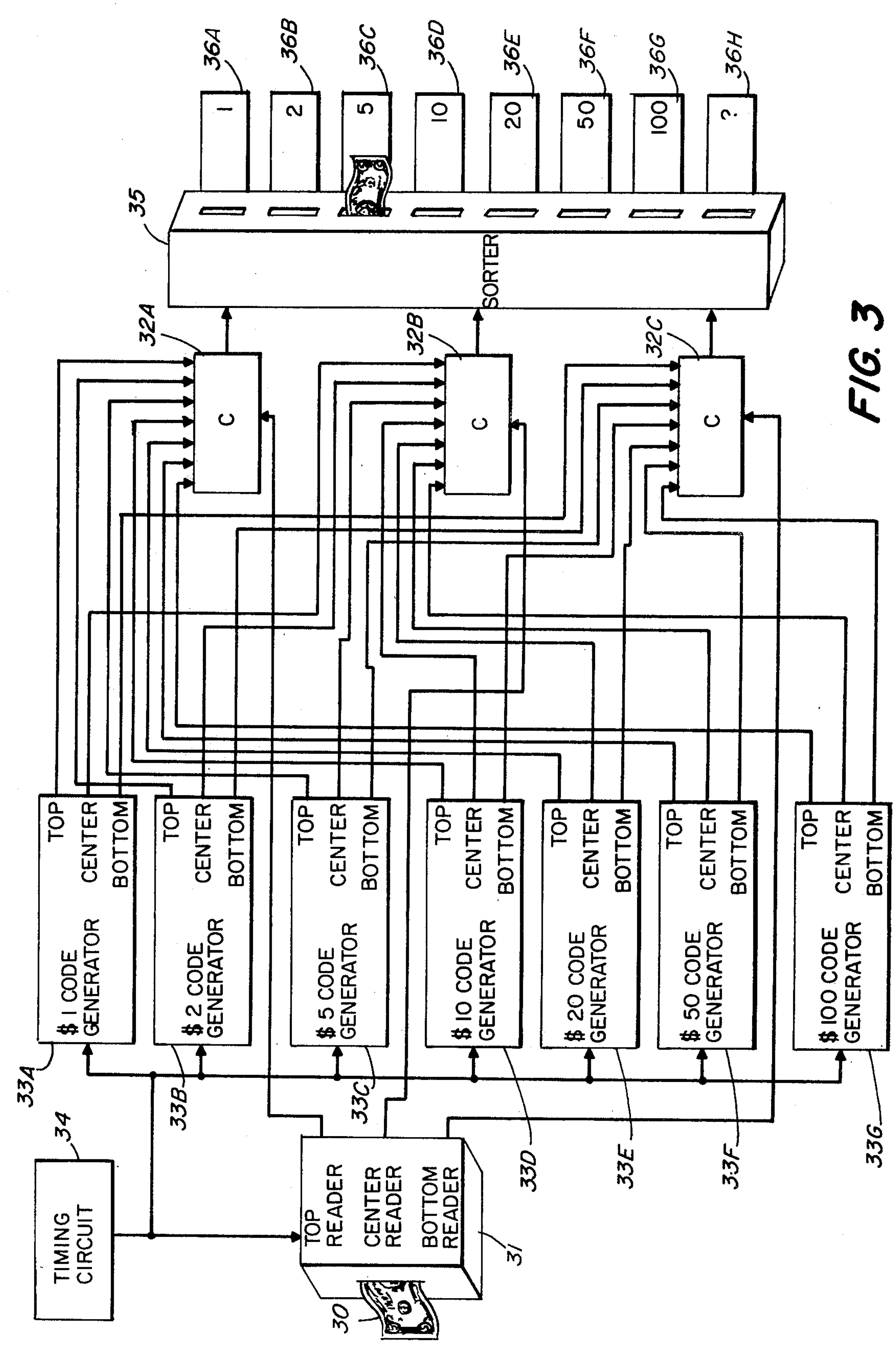
FIG. 3 is a block diagram of a system for scanning paper currency along a plurality of paths, and for determining the denomination thereof.
Figure 4:
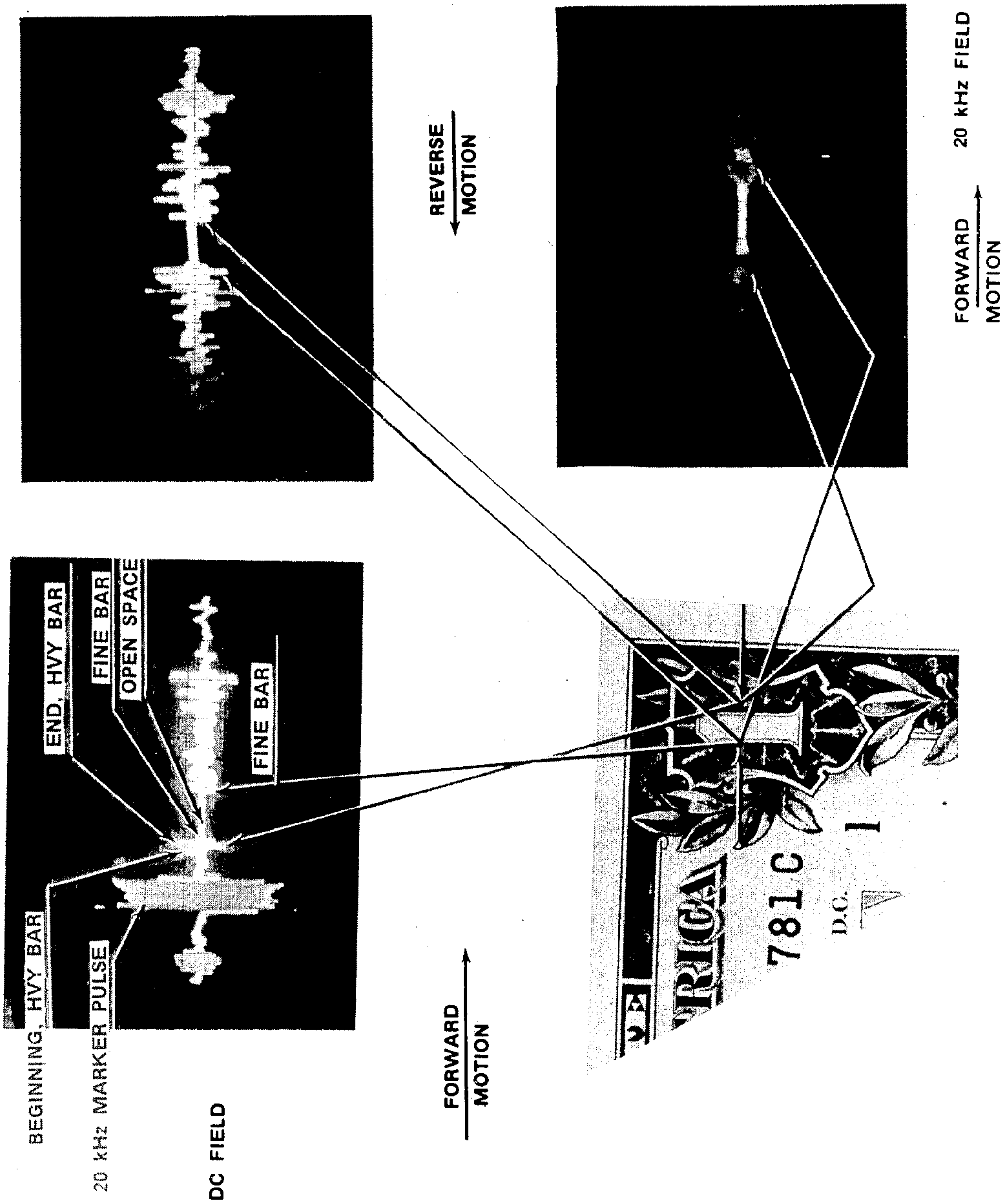
FIGS. 4 through 10 illustrate numeral portions of $1, $2, $5, $10, $20, $50, and $100 Federal Reserve Notes, respectively, together with patterns of magnetic signals sensed when reading such numerals.
Figure 5:
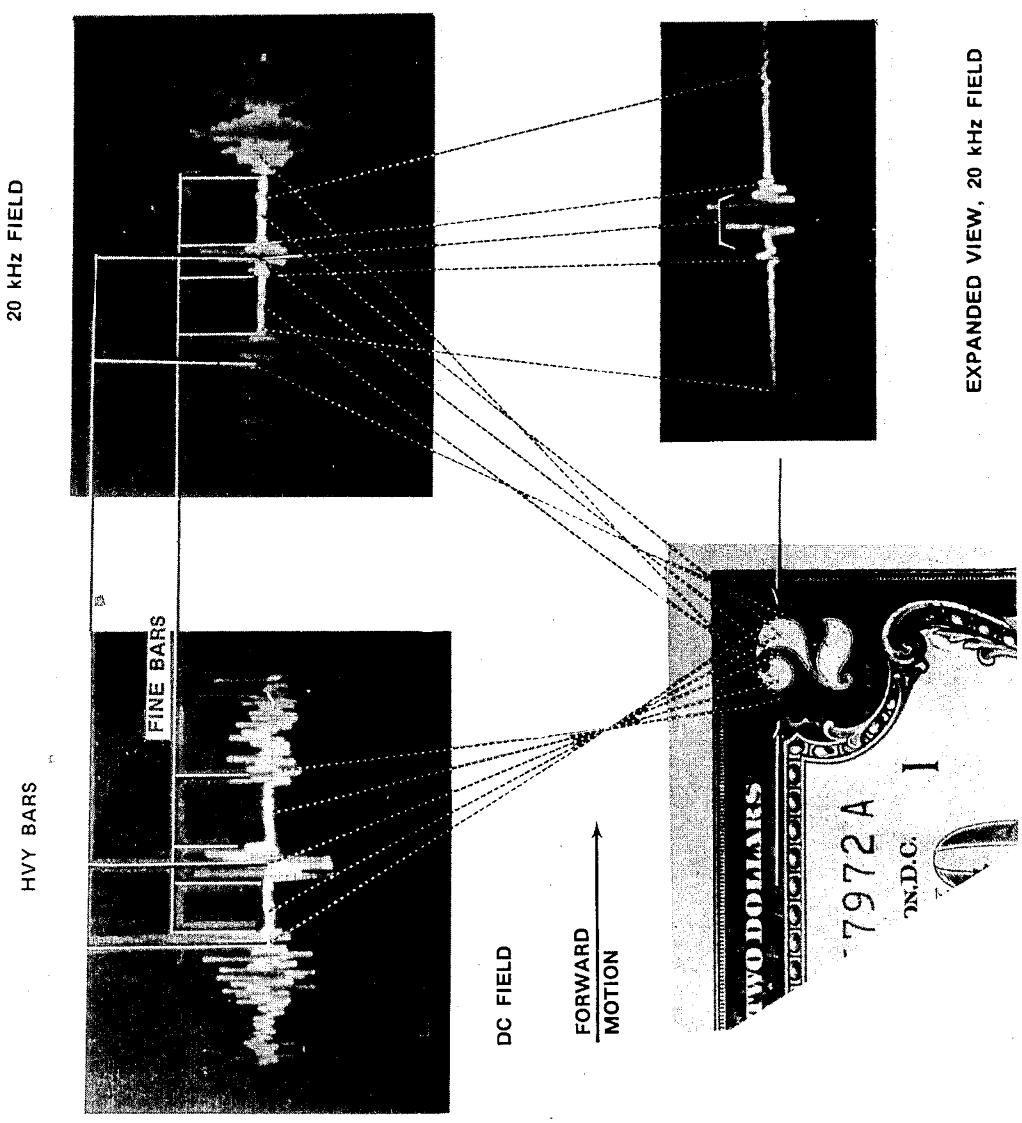
Figure 6:
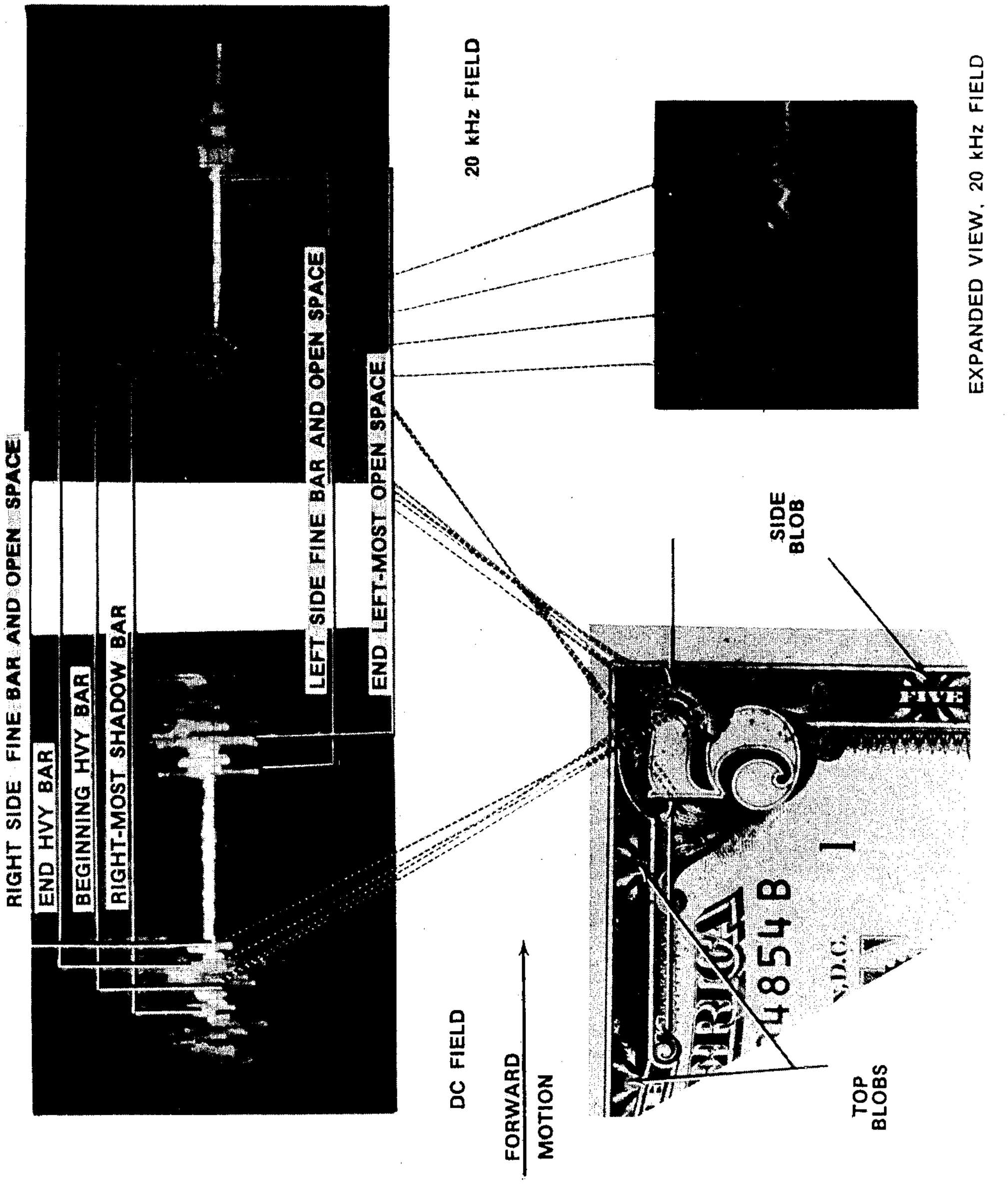
Figure 7:
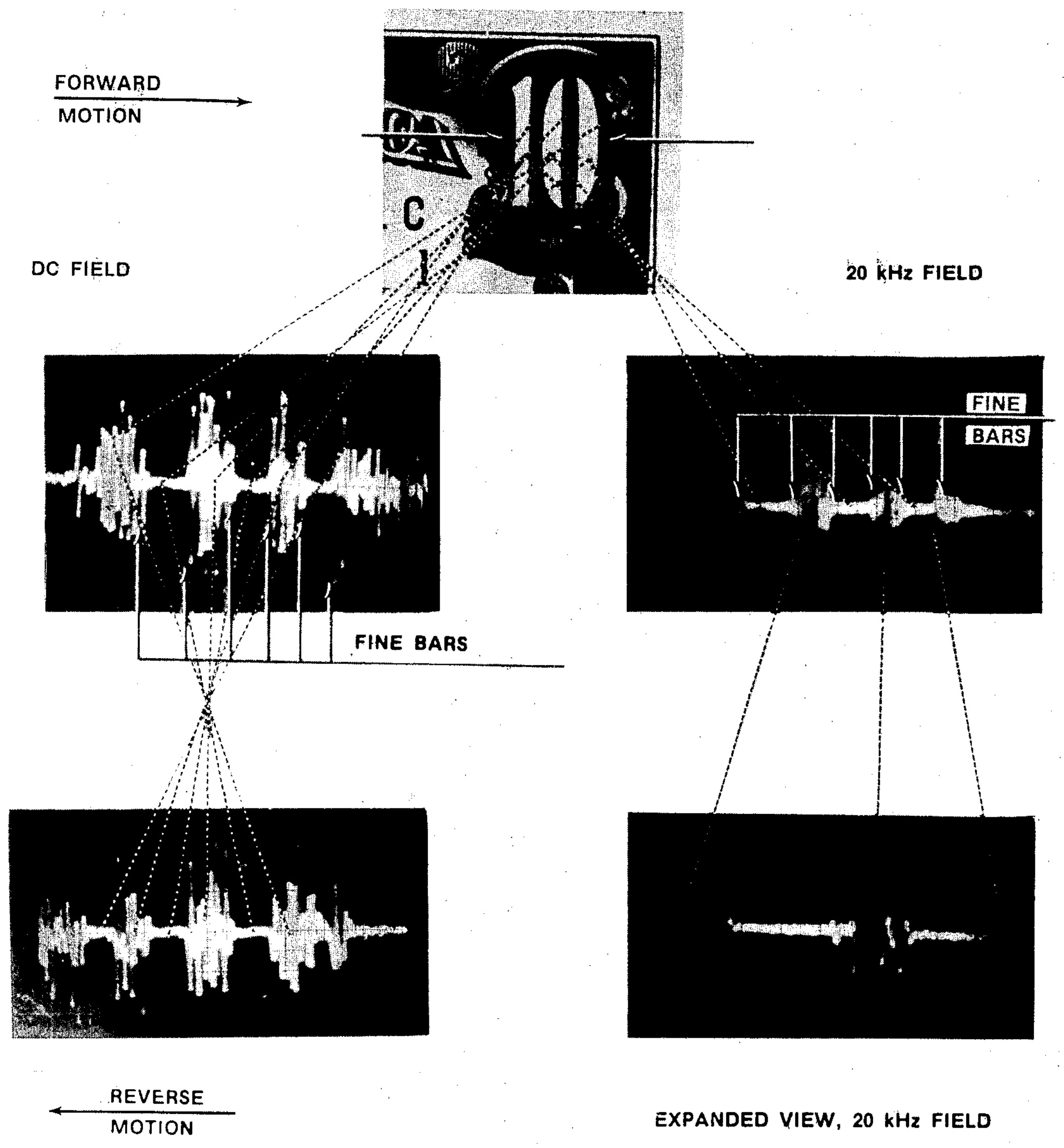
Figure 8:
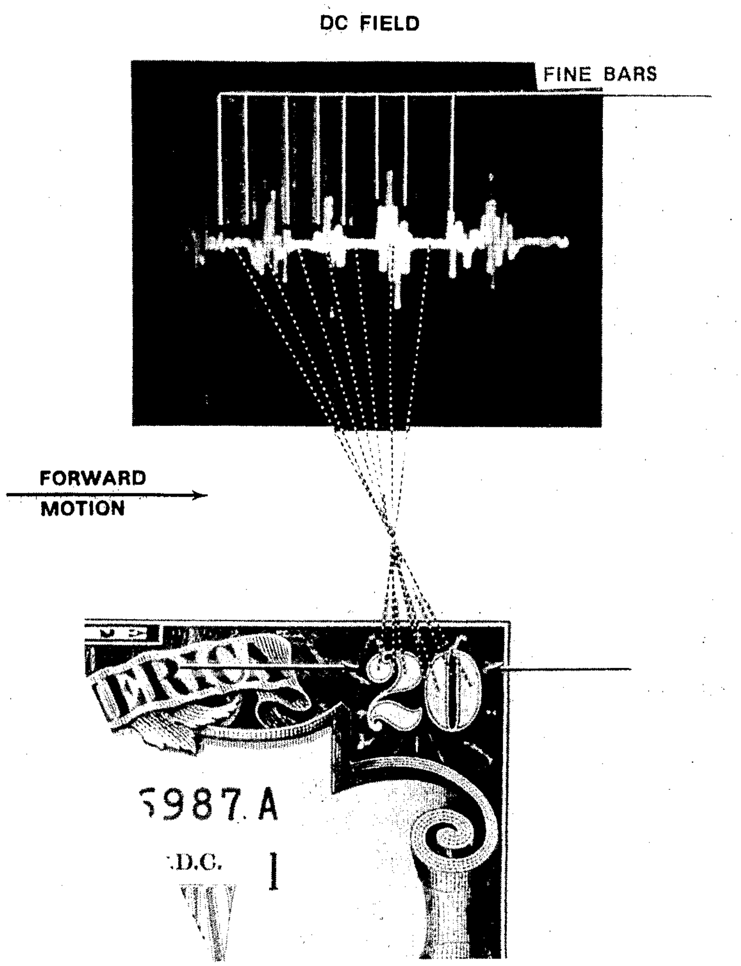
Figure 9:
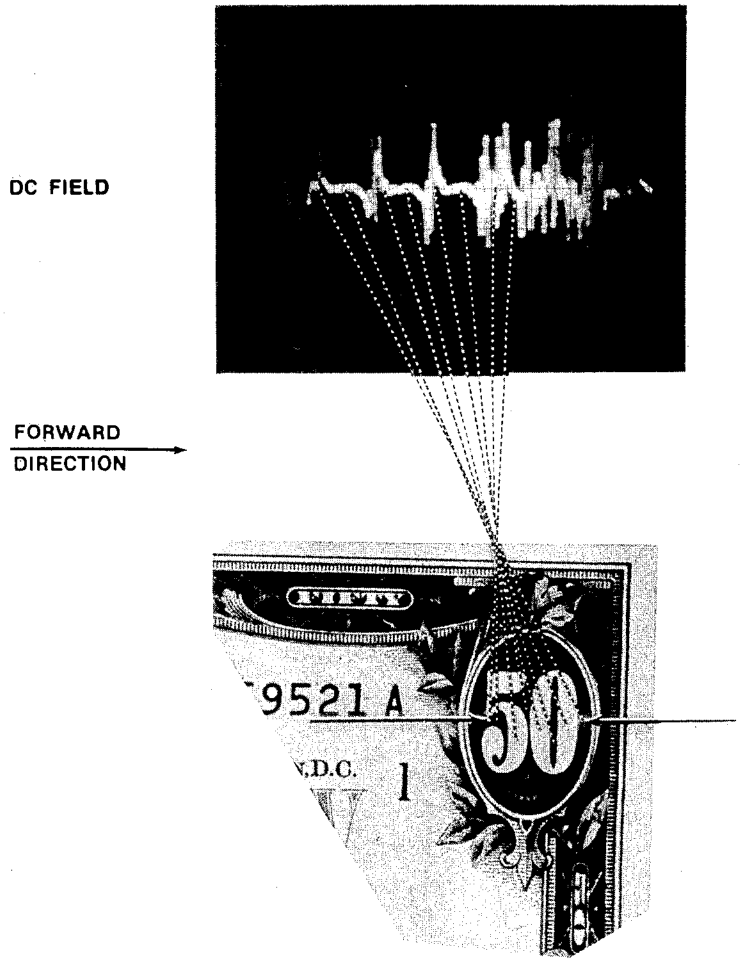
Figure 10:
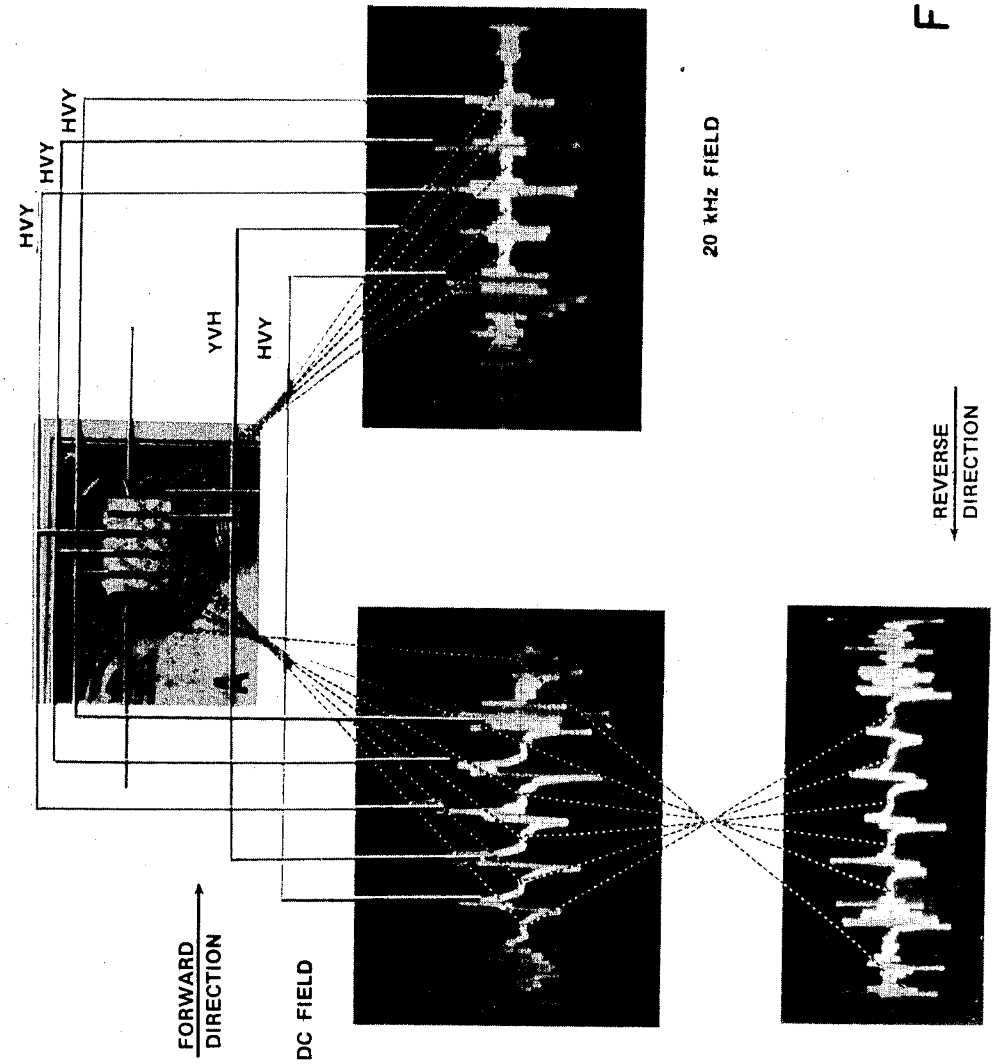

Referring to an illustrative embodiment depicted in FIG. 3, a bill 30 is scanned by a reader 31 which reads a plurality (e.g., three) of paths along a major axis of the bill 30. When reading three paths from the reader 31, three outputs are provided. The reader 31 provides an output from one path to a first comparator 32A; it provides an output from a second path to a second comparator 32B; and it provides an output from a third path to a third comparator 32C. The three paths can be from the top, center, and bottom portions of the bill 30, but need not be; it can be three paths in the upper portion of the bill 30 alone. Code generators 33A–G for each of the bill denominations are provided. A one dollar code generator 33A provides three output signals therefrom: the output signals indicate standard codes for electronic signals generated by reading the top, center, and bottom paths of a genuine one dollar bill, respectively. The code representing the top path of a genuine one dollar bill is coupled from the code generator 33A to the comparator 32A. The code representing the center path of a genuine one dollar bill is coupled from the one dollar code generator 33A to the comparator 32B. Similarly, code representing the bottom path of a genuine one dollar bill is coupled from the one dollar code generator 33A to the comparator 32C. In similar fashion, a two dollar code generator 33B, a five dollar code generator 33C, a ten dollar code generator 33D, a twenty dollar code generator 33E, a fifty dollar code generator 33F, and a one hundred dollar code generator 33G have their top output signals each coupled to the comparator 32A, their center output signals each coupled to the comparator 32B, and their bottom output signals each coupled to the code generator 32C. A timing generator 34 is coupled to each of the code generators 33A through 33G, respectively and is also coupled to the reader 31.

The outputs of each of the comparators 32A, 32B, 32C are coupled to a sorter 35.

In operation, a bill 30 to be denomination sensed is applied to the reader 31. In accordance with the timing circuit 34, the bill 30 is read along three predetermined paths by a top reading head, a center reading head, and a bottom reading head (not shown). The reader 31 provides three output signals indicative of the three paths along the major axis of the bill 30. The three electrical output signals from the reader 31 are applied to the comparators 32A, 32B, 32C. In synchronism therewith, the timing circuit 34 causes the code generators 33A, 33B, 33C, 33D, 33E, 33F, 33G to provide signals indicative of the top paths of respective genuine bills to the comparator 32A, of the center paths of the respective genuine bills to the comparator 32B, and of the bottom paths of the respective genuine bills to the comparator 32C. The comparisons can occur either simultaneously (i.e., in parallel) or they can occur in seriatim, in accordance with methods well known to those in the computer data processing art. The outputs of the comparators 32A, 32B, and 32C, which should all provide proper signals for a genuine bill of a particular denomination, is coupled to the sorter 35, and in accordance with a bill of proper denomination is sorted into a respective bin 36A-G. Were the bill 30 to be a one dollar bill, it would be sorted into the bin 36A. Were the bill 30 to be a legitimate two dollar bill, the sorter 35 would place the bill 30 into the bin 36B. Likewise, the bin 36C receives a genuine five dollar bill, and in similar fashion, the bins 36D, 36E, 36F and 36G receive genuine twenty, fifty and one hundred dollar bills. In the event a bill 30 is provided to the reader 31 which may be of questionable denomination, the bill 30 is inserted into an output bin 36H which indicates that the bill may be exceedingly worn, inverted, reversed, counterfeit, or otherwise requires further examination.

FIGS. 4 through 16 correlate various patterns recorded on the oscilloscope with specific note characteristics. They indicate that various denominations of Federal Reserve Notes can be differentiated by means of magnetic patterns discernible in the blank iron oxide pigmented intaglio ink used to print the obverse faces of the notes.

Examination of FIGS. 4 through 10 show that a scan line through the denomination numerals in the upper corners of the note, as shown by the opposing horizontal arrows, yields a distinct pattern that is unique for each specific denomination. The differences are gross in character. In each case, the note is carried past the read head in a direction indicated by the motion arrows.

The magnetic signals can be sensed with a DC field or, alternatively, with an AC field. In either case, unique patterns are obtained.

The amplitude of the signals, and their time domain, may be different for other currency which might be authorized at some other time. Their system is capable of proper differentiation in such an event.

Other sites on the notes of the various denominations are indicated at FIGS. 11 through 15, including the area under the treasury seal where the denomination names ONE, TWO, FIVE, TEN, TWENTY, FIFTY and 100 are printed, the region near the top center where the legend "Federal Reserve Note" is located, and where heavy deposits of the intaglio ink are located about the border of the notes. In each case, unique patterns are found with gross differences from one denomination to the next.

Figure 11:
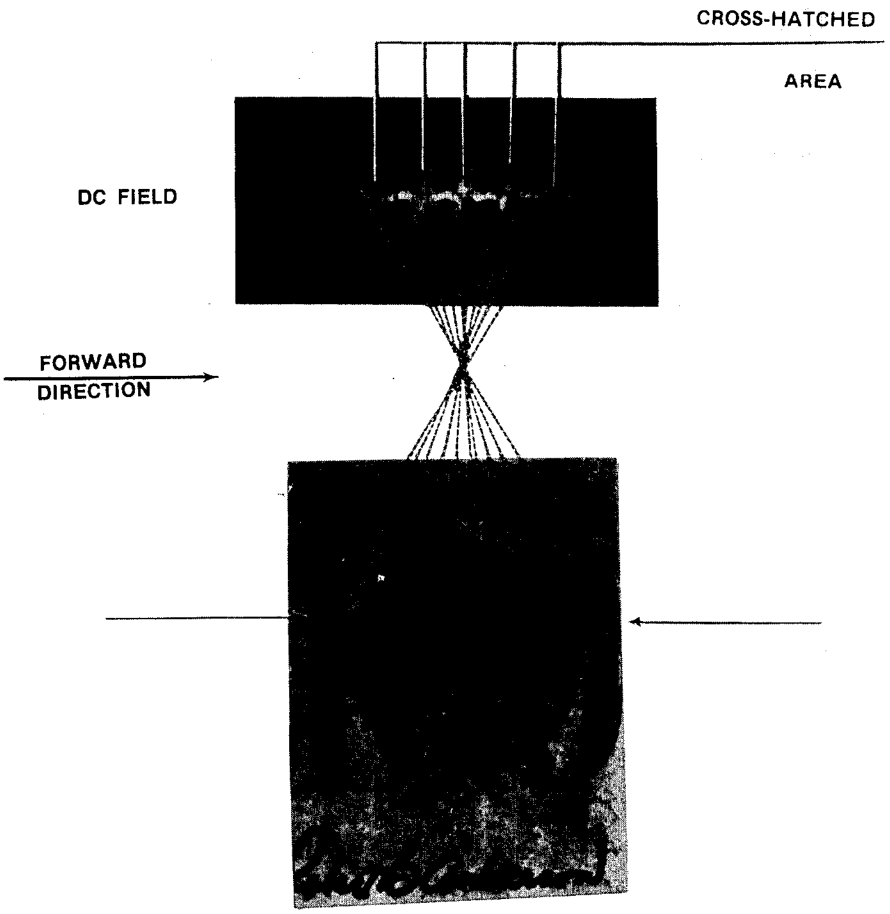
FIG. 11 is a set of views comparing the scanned numeral 100 at the Treasury seal of a $100 Federal Reserve Note with the magnetic signals sensed from a DC field when read in a forward direction.
Figure 12:
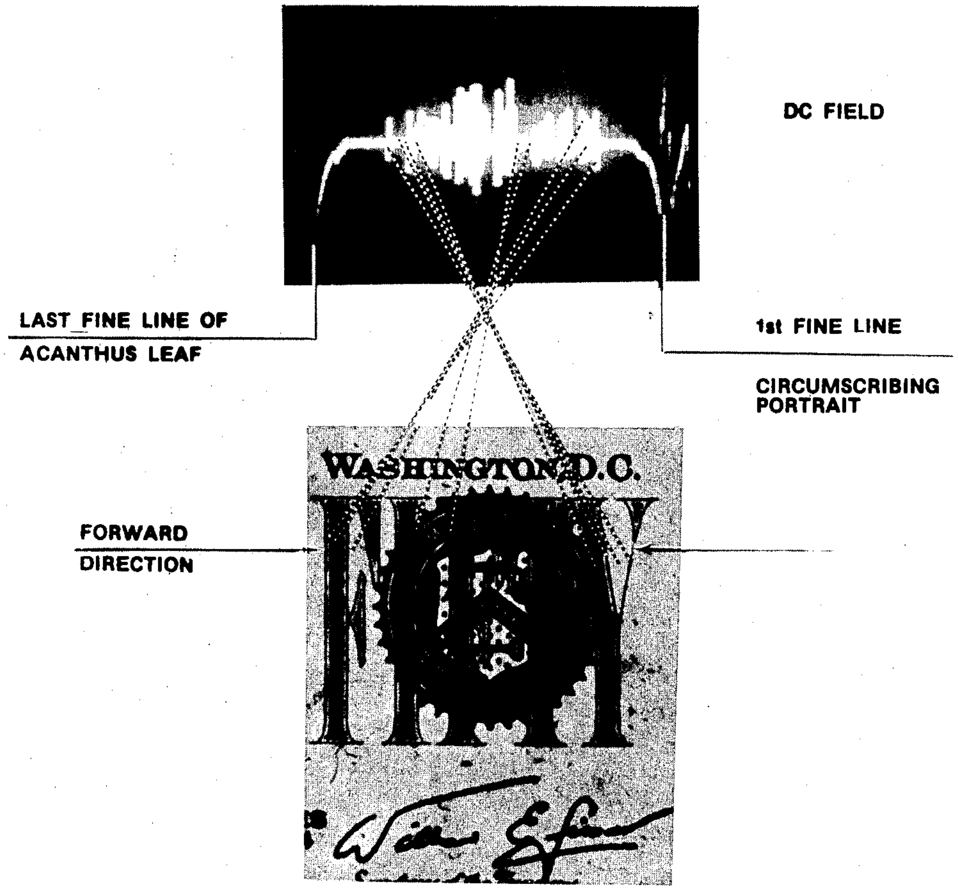
FIG. 12 is a set of views comparing the sensed letters FIFTY at the Treasury Seal of a $50 Federal Reserve Note with the magnetic signals sensed from a DC field when read in a forward direction.

FIGS. 11 and 12 are typical of the results obtained with the seven denomination names. Since the patterns are unique, they too can be used to differentiate the denominations. They can also be used to indicate note orientation: head up/face up, head down/face up, head up/face down, and head down/face down.

Figure 13:
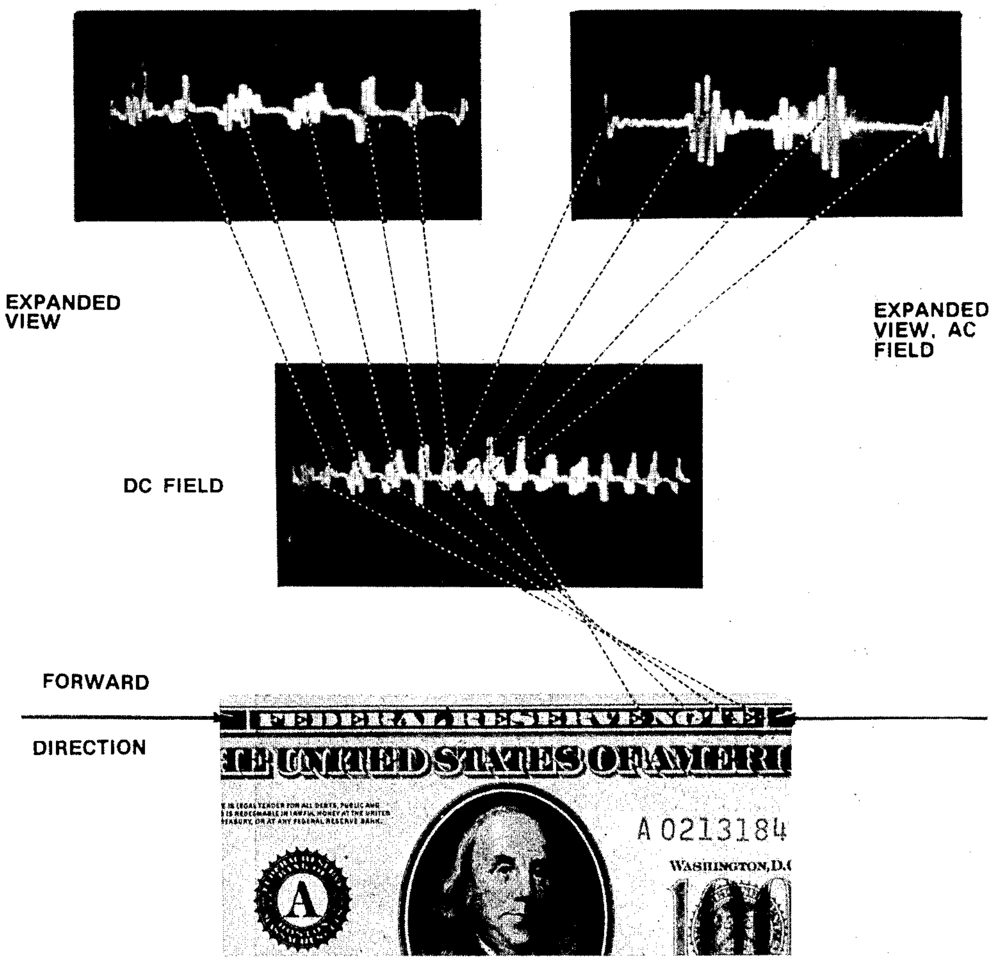
FIG. 13 is a set of views comparing the FEDERAL RESERVE NOTE legend of a $100 Federal Reserve Note with magnetic signals sensed from a DC field when read in the forward direction.
Figure 14:
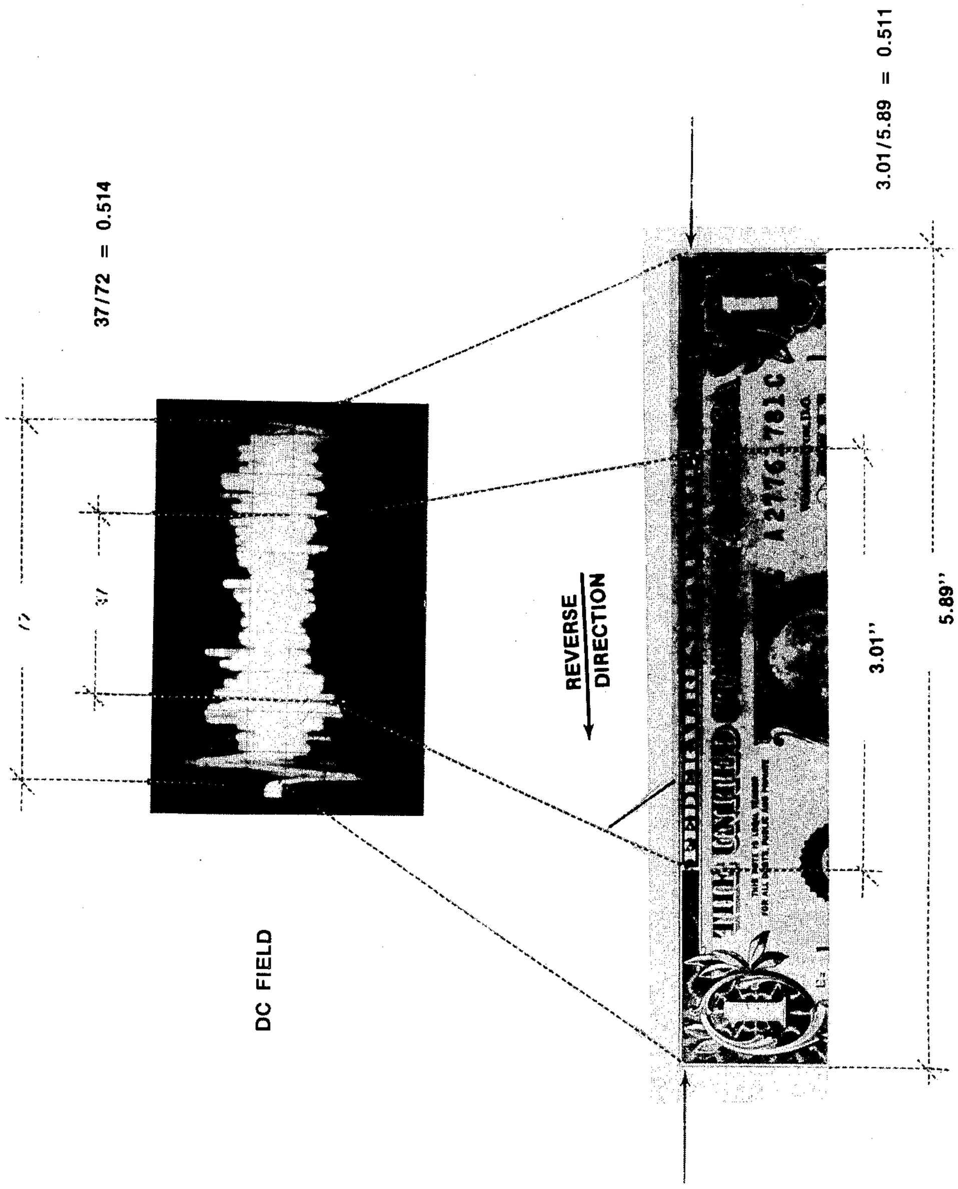
FIG. 14 is a set of views comparing the FEDERAL RESERVE NOTE legend of a $1 Federal Reserve Note with magnetic signals sensed from a DC field written and read from the reverse face of the Note (in the reverse direction)

The pattern obtained from a Federal Reserve Note legend is shown in detail in FIG. 13 for a 100 dollar Federal Reserve Note. Similar results are obtained with other notes. The pattern shown in FIG. 14 was obtained by writing and reading a signal from the reverse face of a one dollar Federal Reserve Note in the reverse direction. The compressed oscilloscope pattern enables one to observe the entire length of the document. Measurements of the scope trace indicate that the ratio of legend length to document (printed portion) length is 0.514. The actual ratio for measurements on the note is 0.511.

The following chart indicates the measured ratios and other dimensions for the seven denominations.

| DENOMINATION | RATIO, FRN LEGEND LENGTH TO NOTE LENGTH | DISTANCE, INCHES, TOP MARGIN LINE TO BOTTOM OF FRN LEGEND | WIDTH, INCHES OF LEGEND |
|---|---|---|---|
| $1 | 0.511 | 0.259 | 0.12 |
| $2 | 0.346 | 0.485 (@ end) | 0.065 |
| $5 | 0.445 | 0.420 (@ end) | 0.075 |
| $10 | 0.475 | 0.223 | 0.087 |
| $20 | 0.538 | 0.193 | 0.075 |
| $50 | 0.348 | 0.200 | 0.063 |
| $100 | 0.543 | 0.230 | 0.117 |

Figure 15:
FIG. 15 depicts a set of Federal Reserve Note legend areas for the seven Federal Reserve Note denominations in general circulation.
Figure 15:
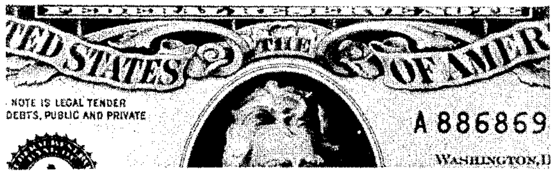
Figure 15:
Figure 15:
Figure 16:
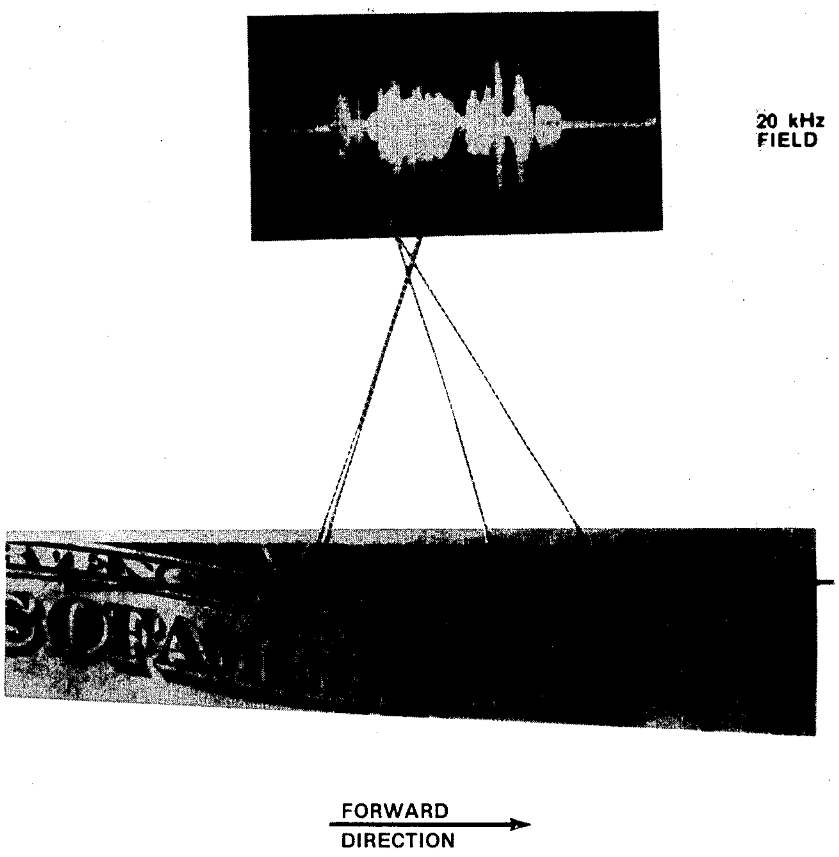
FIG. 16 compares the upper border area of a $5 Federal Reserve Note with magnetic signals sensed from an AC field when read in the forward direction.

The foregoing table lists other measurements made upon the various denominations shown in FIG. 15. It can be seen that a combination of reading the denomination numerals, denomination names and measuring the length, altitude and width of the Federal Reserve Note legend provides the information necessary to determine the denomination of the documents. Note that the length ratios of a $2 Federal Reserve Note is 0.346 and of the $50 Federal Reserve Note 0.318, but that the legend is 0.483 inch below the margin in a $2 Federal Reserve Note and only 0.200 inch down in a $50 Federal Reserve Note. (It is further noted that reading the numerals alone does not suffice due to the occasional raised note that is altered by covering over the true numbers in the corners of the raised note with those cut from a higher denomination note). The $20 and $100 Federal Reserve Notes have ratios of 0.538 and 0.543, respectively, but the width of the $20 Federal Reserve Note legend is only 0.075 inch while that of the $100 bill is 0.117 inch.

Additionally, the $5 and $50 Federal Reserve Notes contained deposits of ink at points around the border of the notes. Two of these points and the corresponding oscilloscope trace are shown for the $5 Federal Reserve Note in FIG. 16. There are caret marks on the bottom and sides of the $10 Federal Reserve Note and $1 Federal Reserve Note (not shown) which have discrete pattern elements.

It is noted that this invention can be used in other formats, such as detection of the authenticity of stock certificates and currency of other countries, and can be used in other types of document authentication. It is desired that this invention be limited solely by the scope of the appended claims.

What is claimed is:

1. A method for sensing the denomination of U.S. Federal Reserve Notes comprising magnetically scanning at least three parallel predetermined paths along an obverse surface of a Note to be denomination sensed;

comparing the results of said scanning against a like plurality of standards for each of the various denominations: one, two, five, ten twenty, fifty, and one hundred dollars;

determining whether the scanned Note is of said one dollar denomination, said two dollar denomination, said five dollar denomination, said ten dollar denomination, said twenty dollar denomination, said fifty dollar denomination, said one hundred dollar denomination or is questionable; and sorting said scanned Note in accordance with such determination.

2. Apparatus for sensing the denomination of U.S. Federal Reserve Notes comprising means for magnetically scanning at least three parallel predetermined paths along an obverse surface of a Note to be denomination sensed;

means for comparing the results of such scanning against a like plurality of standards for each of the various denominations: one, two, five, ten, twenty, fifty, and one hundred dollars;

means for determining whether the scanned Note is of said one dollar denomination, said two dollar denomination, said five dollar denomination, said ten dollar denomination, said twenty dollar denomination, said fifty dollar denomination, said one hundred dollar denomination, or is questionable; and means for sorting said scanned Note in accordance with such determination.

* * * * *